INVENTOR:
THOMAS W. CARRAWAY
BY:
Baldwin & Wight
his ATTORNEYS

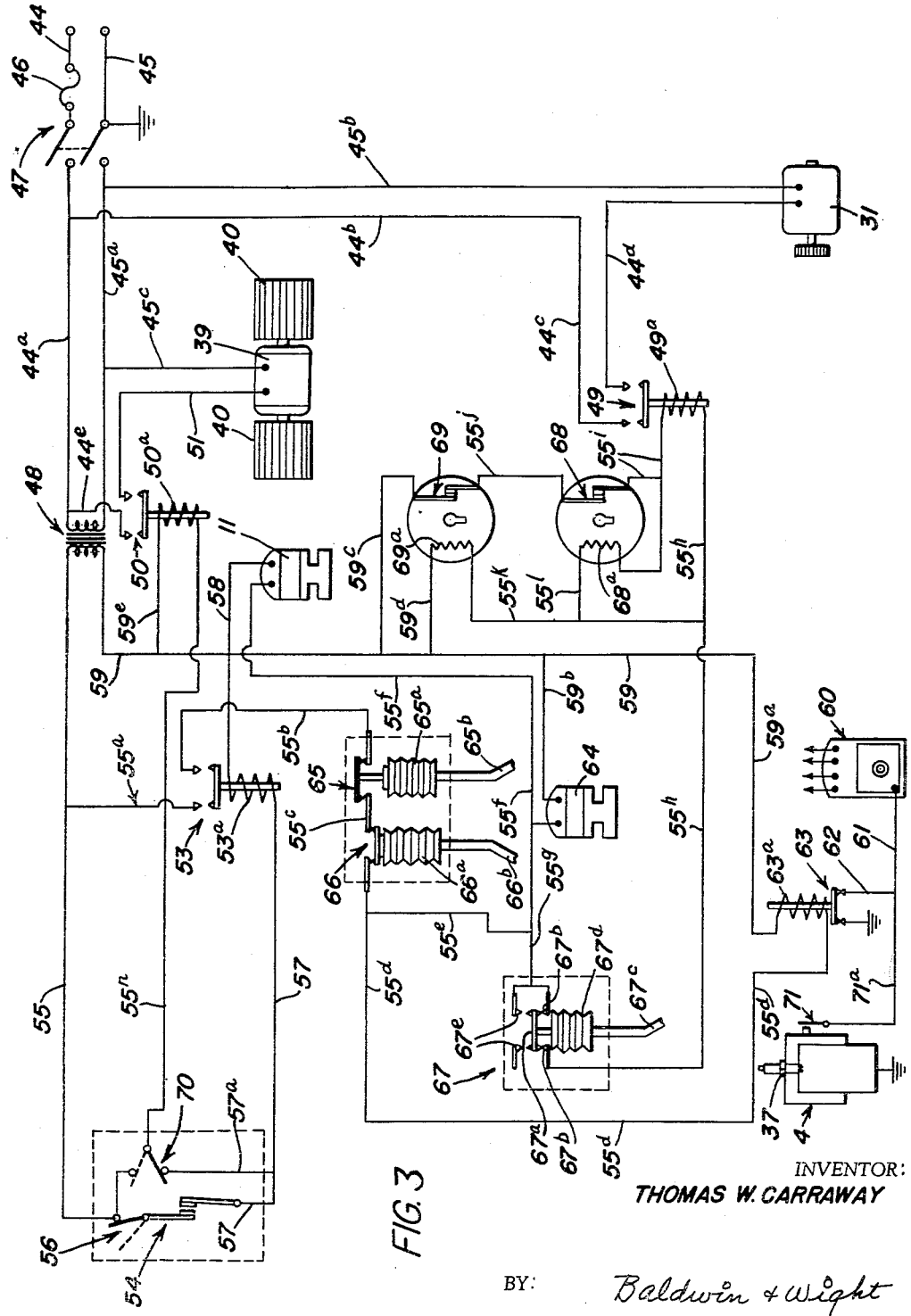

INVENTOR
THOMAS W. CARRAWAY
BY: Baldwin + Wight
his ATTORNEYS

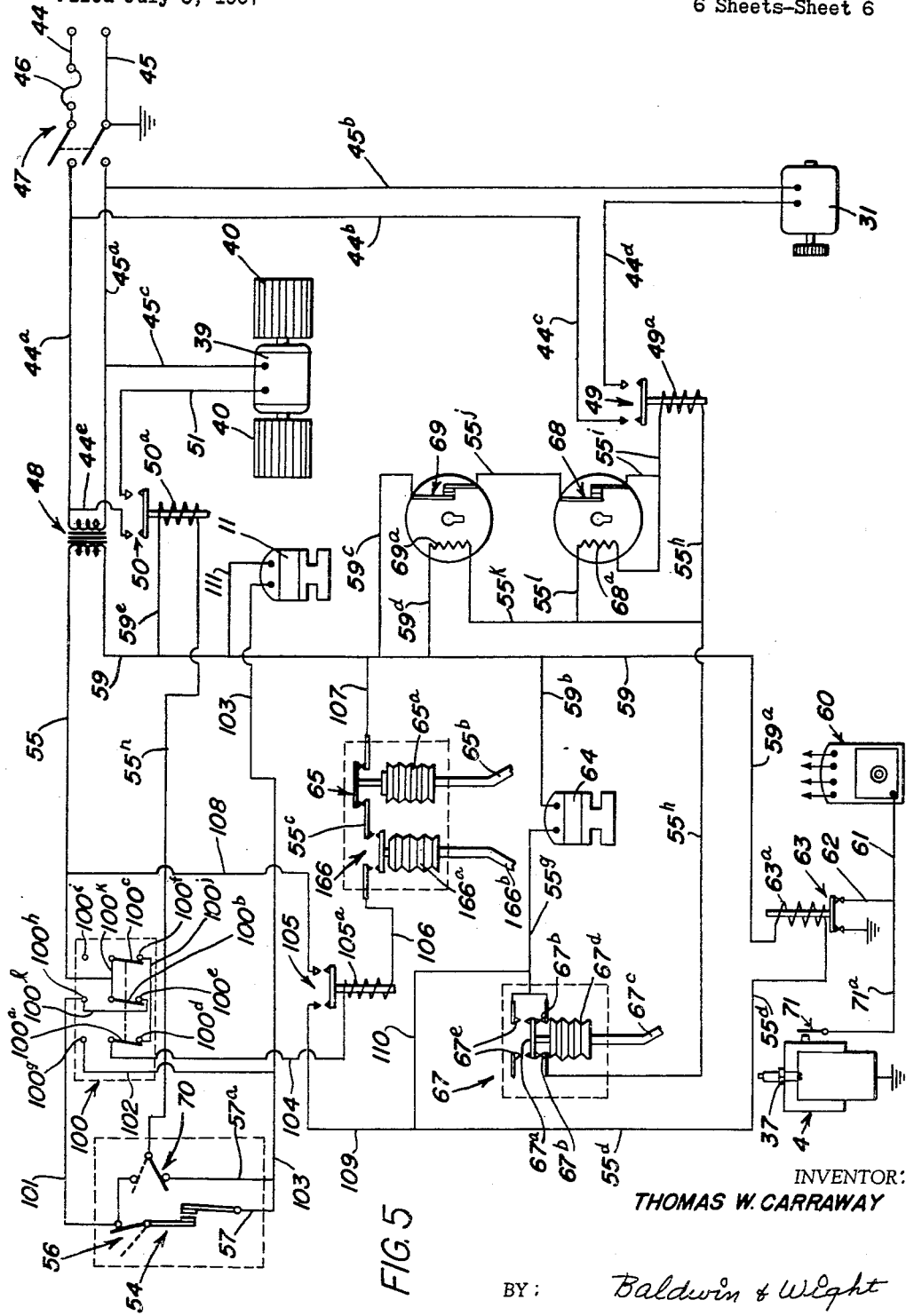

United States Patent Office 2,984,993
Patented May 23, 1961

2,984,993
CONTROL MECHANISM FOR COOLING AND CONDENSING EQUIPMENT

Thomas W. Carraway, 3304 Miramar, Dallas, Tex.

Filed July 3, 1957, Ser. No. 669,848

17 Claims. (Cl. 62—171)

This invention relates to mechanism for controlling cooling and condensing equipment, and more particularly to mechanism for controlling equipment of this kind powered by an internal combustion engine. While mechanism according to the invention is capable of being used advantageously in connection with cooling and condensing equipments in general, it is especially suited for controlling the operation of equipment comprising a refrigerant compressor drivable by an internal combustion engine. Further advantages are obtainable in the use of control mechanism embodying the invention in connection with evaporative condensers of the kind customarily including an air duct, a heat exchanger such as a set of condenser coils positioned within the air duct in the path of an air stream flowing through the duct, and a means for dispersing evaporative liquid, e.g. water, within the duct.

Mechanism for controlling evaporative cooling and condensing equipment powered by electrical motor means is disclosed and claimed in the co-pending application of Thomas W. Carraway, Serial No. 571,771, filed March 15, 1956, now Patent No. 2,847,831. While electrically powered cooling and condensing equipment has long been used effectively in many geographical areas, it is incapable of taking advantage of the potential saving in power costs available in other areas where natural gas or petroleum fuels are plentiful and cheap. Recently, there has been considerable development in the field of cooling and condensing equipment powered by internal combustion engines inherently capable of taking advantage of the lower power cost of using gaseous or petroleum fuels, but new control problems, such as co-relating the starting and stopping of the engine with the operation of the various control valves and liquid dispersing equipment, have been encountered.

An object of the present invention is to provide improved control mechanism for internal combustion engine powered cooling and condensing equipment capable of effectively coordinating the operation of an internal combustion engine and some though not necessarily all of a complement of other elements such as a fuel supply valve, a refrigerant control valve, a compressor, a condensing air stream fan, evaporative liquid disperser, and cooled air blower.

Another object of the invention is to provide control mechanism of the kind referred to which is optionally settable for effecting starting of the engine in direct response to call for cooling by a thermostat in an area to be cooled, or for indirectly controlling starting of the engine in response to building up of pressure on the intake side of the compressor caused by opening of a refrigerant control valve in response to the thermostatic call for cooling.

Another object of the invention is to provide control mechanism of the class referred to in which the liquid dispersing means is brought into operation only after the internal combustion engine has been started and is operating under its own power at a predetermined speed.

Another object of the invention is to provide means for starting the internal combustion engine, for example by thermostatic call for cooling, with safeguards for preventing prolonged and possibly harmful cranking of the engine without its being started effectively to run under its own power within a normal starting period.

A further object of the invention is to provide arrangements for transmitting drive from the engine to the compressor suitable for use in various types of installations in which the engine and compressor may not always be alignable or otherwise relatively positionable in the same way.

Other objects of the invention will become apparent from a reading of the following description, the appended claims, and the accompanying drawings, in which:

Figure 2:
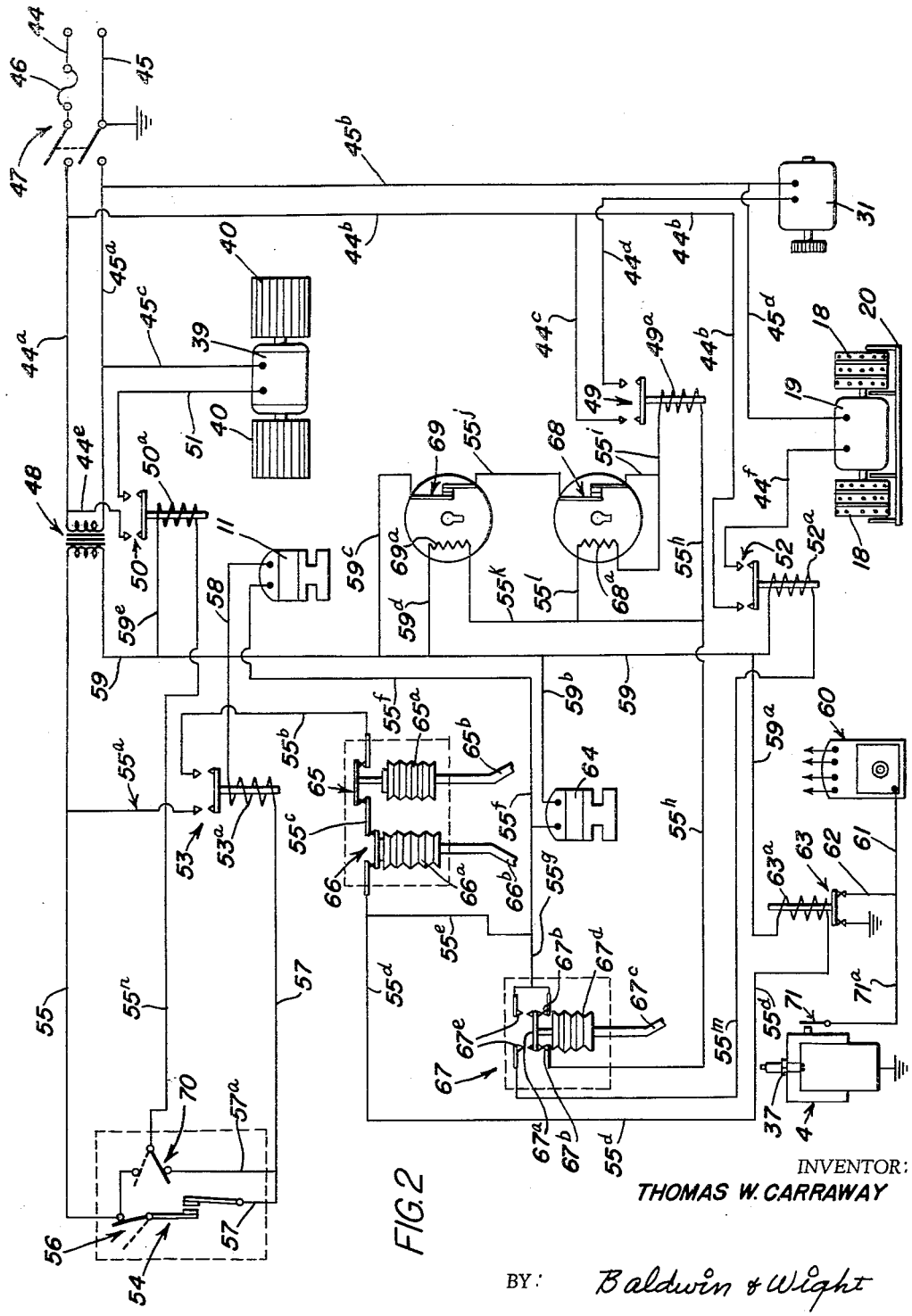
Figure 2 is a wiring diagram of a preferred arrangement for controlling the condensing equipment directly in response to a thermostatic call for cooling, certain control devices and parts of the condensing and cooling equipment including an internal combustion engine starting motor, engine ignition means, evaporative liquid dispersing means, and cooled air blower means being shown schematically.
Figure 3:
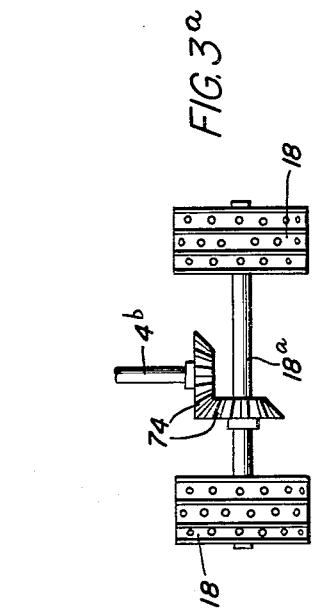
Figure 2A:
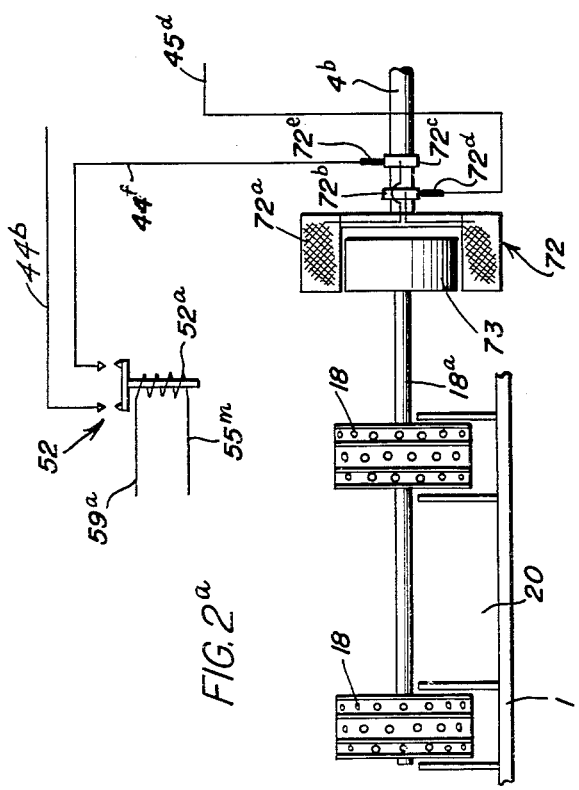
Figure 2B:
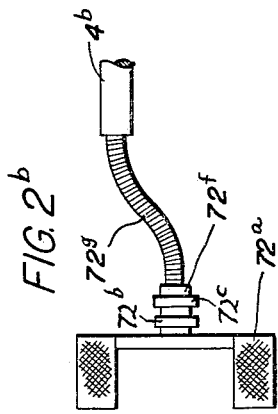
Figure 4:
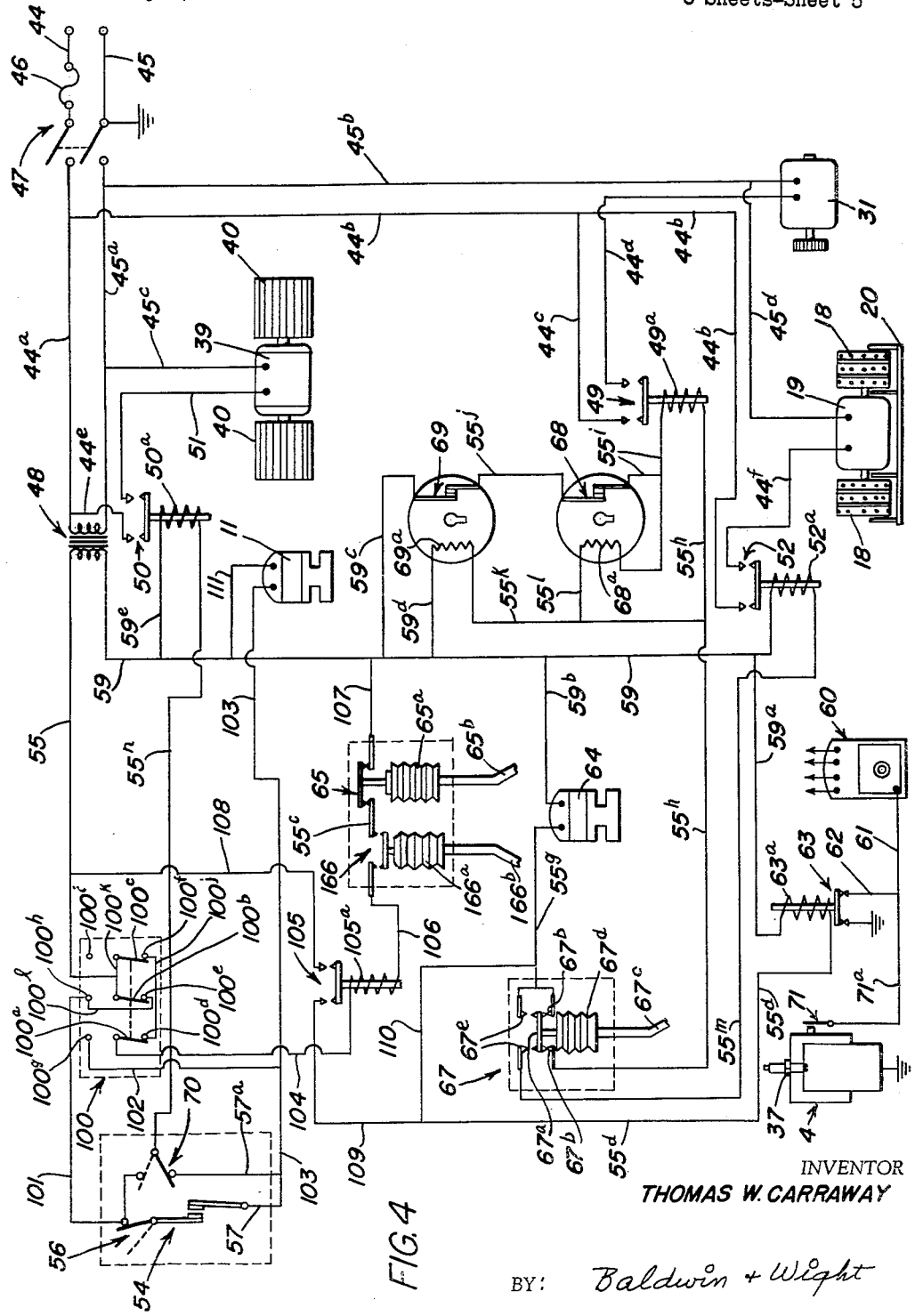

Figure 2$^a$ is a schematic showing of a modified construction for transmitting drive from the internal combustion engine to the compressor when the equipment is controlled by an arrangement of the kind shown in Figure 2;

Figure 2$^b$ is a schematic showing of a modified arrangement for transmitting drive from the internal combustion engine to the compressor when the engine and compressor, controlled by mechanism as shown in Figure 2, cannot conveniently be aligned;

Figure 3 is a wiring diagram similar to Figure 2, but in which the control means is modified for adaptation to an installation in which liquid dispersing means is driven directly by the internal combustion engine;

Figure 3$^a$ is a schematic showing of a modified arrangement for transmitting drive from the engine to the dispersing means when using the control circuit shown in Figure 3;

Figure 4 is a schematic wiring diagram of a control arrangement optionally settable or conditionable for effecting starting of the engine directly in response to the thermostatic call for cooling, or for starting the engine only after refrigerant pressure on the intake side of the compressor has built up to a predetermined value in consequence of opening of a refrigerant control valve under the control of the thermostat when the engine and compressor are not running; and Figure 5 is a schematic wiring diagram similar to Figure 4, but modified for adaptation to an installation in which the liquid dispersing means is operable directly by the internal combustion engine.

Mechanism according to the invention may be embodied in or used in connection with cooling and condensing equipment of various kinds, for example evaporative condensing and cooling equipment of the kind shown in the copending application of Thomas W. Carraway, Serial No. 374,565, filed August 17, 1953, now Patent No. 2,841,369, issued July 1, 1958. Control mechanism of the kind included in constructions embodying the invention is particularly suited for controlling condensing and cooling equipment driven by a gas fueled internal combustion engine, for example equipment including some arrangements of components of the general character disclosed in the application of Thomas W. Carraway, Serial No. 394,632, filed November 27, 1953.

Figure 1:
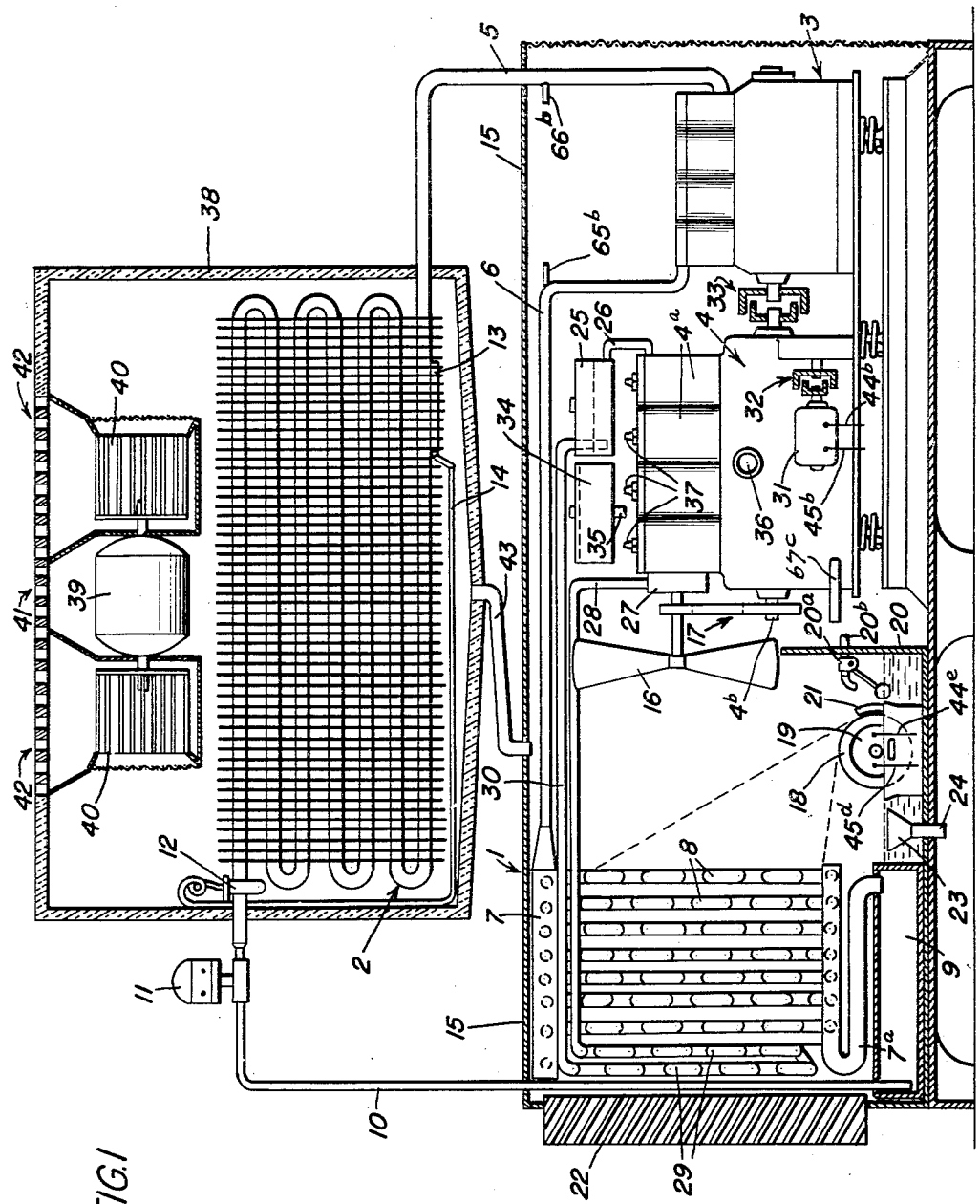
Figure 1 is a schematic view showing refrigerating and condensing equipment including a compressor arranged to be driven by an internal combustion engine under the control of mechanism embodying the invention.

As illustrated schematically in Figure 1, a representative cooling system includes an evaporative condenser generally designated 1, a cooling or evaporator coil equipment 2, and a compressor 3 operable by an internal combustion engine 4 for receiving expanded refrigerant from the coil equipment 2 through an intake pipe 5 and delivering compressed refrigerant through a discharge pipe 6 to a hot refrigerant gas header 7 and thence to condenser or heat exchanger coils 8 forming part of the condenser equipment 1. Refrigerant condensed in the coils 8 is delivered to a liquid cooler bottom header 7ª and thence to a liquid refrigerant receiver 9 from which the condensed refrigerant is delivered through a pipe 10, controlled by a solenoid valve 11, to an expansion valve 12 of conventional construction controlling the passage of refrigerant to and expansion of the refrigerant in the evaporator coil 2. The expansion valve 12 may be controlled in a conventional manner, for example by means including a gas container or bulb 13 in heat conducting contact with the lower part of the evaporator coil 2, and having communication with the expansion valve actuator through a tube 14. The cooling system may be charged with any suitable refrigerant, F-12 Freon being a preferred one.

In general, the basic cooling or refrigerating cycle is conventional, the compressor 3 receiving gaseous refrigerant through the intake or suction pipe 5, and compressing and delivering the refrigerant through the pipe 6 to the hot gas header 7 and condenser coils 8 in which it is condensed. The condensate is delivered to the cooler coil 7ª and thence to the liquid receiver 9 under pressure sufficient to force refrigerant through the pipe 10 past the solenoid valve 11 when the latter is open, and thence through the expansion valve 12, when open, to the evaporator coil 2 in which the refrigerant is expanded to cool the surrounding space, and is then returned in gaseous condition to the compressor 3 by way of the intake pipe 5.

The evaporative condenser equipment 1 is not conventional in the generally accepted sense of the term, but in some ways is similar to the evaporative condenser equipment disclosed in co-pending application Ser. No. 374,565 previously referred to. As shown schematically in Figure 1 of the present application drawings, the evaporative condenser equipment 1 includes an air duct 15 which houses the heat exchanger coils 8 over which a current of air may be forced by a fan or blower 16 mounted within the duct 15 and being drivable by the internal combustion engine 4 through a pulley and belt drive mechanism generally designated 17. For augmenting the cooling effect of the air forced over the condensing coils 8, provision is made for introducing water in dispersed condition into the duct 15 for extracting heat by evaporation. For this purpose, a liquid disperser including a plurality of rotatable disks, one of which is shown at 18, is mounted in the bottom of the duct 15, and an electric motor 19 is arranged to drive the disks 18 to cause the latter to pick up water or other evaporative liquid from a pan or reservoir 20 provided in the bottom part of the duct 15, and throw the liquid off in the form of a fog or mist into the part of the duct between the fan 16 and the condensing coil 8 in a manner to envelop the coil and maintain it wet. Preferably, a deflector 21 is provided for directing liquid thrown off by the disks 18 toward the coil 8 and away from the blower or fan 16. Baffles or louvers 22 are arranged at the outlet end of the duct 15 for intercepting relatively large drops of liquid which may have passed the coil 8, and for returning the intercepted liquid to the pan or reservoir 20.

Any suitable means such as a float controlled valve 20ª may be provided for automatically controlling the adding of makeup liquid from a supply pipe 20ᵇ to the reservoir 20 for replacing liquid which has been dissipated by evaporation during normal operation of the equipment.

Dispersion of the evaporative liquid in the condition most conducive to efficient cooling by evaporation may be promoted by maintaining the liquid free of foreign matter and at a predetermined constant level in the tank 20. For accomplishing this purpose in concert with the float valve 20ª, a liquid overflow device comprising a funnel shaped skimmer 23 at the upper end of an overflow pipe 24 is mounted in the bottom of the duct 15 with the top of the skimmer 23 at the level desired to be maintained. The construction of the skimmer 23 in the shape of a funnel with a widely spread out upper edge or rim results in overflow liquid passing into the skimmer in a thin film or sheet extending around the skimmer, which serves efficiently to drain off floating debris or impurities from the top of the liquid in the pan or reservoir 20. This efficient removal of particulate matter minimizes the formation of deposits on the condensing coils 8, and thus enables the latter to remain in efficient operating condition with a minimum loss of time for cleaning the coils.

The internal combustion engine 4 is arranged to be cooled by the same fan 16 as cools the compressed hot refrigerant and a liquid coolant circulation system. As indicated schematically in Figure 1, the engine is provided conventionally with a water jacket 4ª which receives cooling water from a supply tank 25 through a pipe 26. Cooling water is drawn through the water jacket 4ª by a pump 27 and forced through a pipe 28 to cooling or radiator coils 29 extending across the duct 15 between the condenser coils 8 and the louvers 22. The heat exchanger 8 is positioned on the upstream side of the radiator so that moistened air which has passed over the condenser coils will flow in contact with the engine cooling water radiator 29 before being discharged from the duct. The volume of air delivered by the fan 16 and the cooling effect of the evaporative liquid delivered by the disperser 18 are sufficient to carry the load of cooling the engine coolant in the radiator 29 as well as cooling and condensing the refrigerant in the coils 8. Water which has been cooled in the radiator coils 29 is forced through a pipe 30 back to the cooling water tank 25 by the pump 27.

The engine 4 is provided with a starting motor and clutch which may be of conventional construction and arrangement, illustrated schematically in Figure 1 as comprising an electrical starting motor 31 connectable to the engine through a clutch 32 adapted automatically to become engaged upon starting of the motor 31 when the internal combustion engine 4 is not running. A speed responsive or over-running clutch or a so-called "Bendix drive" or any other clutch of this general character may be used.

When the engine 4 is not operating, it is not drivingly connected to the compressor 3, but is free to be started under no-load condition and then to become drivingly connected to the compressor 3 when it has attained operating speed. For this purpose, a suitable speed responsive clutch, schematically indicated at 33 in Figure 1, is interposed between the engine shaft and the compressor shaft.

The engine 4 may be equipped with an oil reservoir 34 connected by a pipe 35 to the engine sump for maintaining the oil at a predetermined level in the sump without the necessity of frequently adding oil manually. The engine, shown only schematically, is also provided with a suitable gaseous fuel intake conduit designated 36 and with the usual spark plugs 37.

The evaporator coil 2 may be used for various cooling purposes such as for cooling a refrigerator for maintaining stored foods or other goods in proper condition, or for cooling a living enclosure for comfort. In the arrangement shown, the coil 2 is enclosed within an insulated housing 38 which also encloses an electrical blower motor 39 and twin fans or blowers 40, 40 mounted on opposite ends of the motor shaft. The top of the housing 38 is formed as a grill or the like providing an air intake section 41 through which air is induced by the blowers 40, and cooled air discharge sections 42, 42 through which air, cooled by passage over the coil 2, is forced by the blowers 40 into the conditioned area.

A condensate drain 43 leads from the lowermost part of the inwardly-centrally sloping bottom of the housing 38 to the top of the duct 15 for delivering condensate dropped from the coil 2 to the air stream flowing through the duct 15. During normal operation, condensate passing through the drain pipe 43 into the duct 15 will be entrained in the air stream to assist in evaporatively cooling the condenser coils 8. Any condensate discharged from the housing 38 through the drain 43 when the condensing equipment is not in operation will drop into the pan or reservoir 20 and, if sufficient in quantity, will overflow through the skimmer 23 and pipe 24.

Prior to the performance of a normal operating cycle, all of the parts and equipment referred to to this point are at rest when no cooling of the condition area is called for by the thermostatic control means to be described later. When the thermostatic control means calls for delivery or cooled air to the conditioned space, the engine 4 is conditioned for operation and the starting motor 31 is activated. When the engine 4 has been started and is operating on fuel delivered through the inlet 36 and has attained a predetermined operating speed, the clutch 33 is automatically engaged to drive the compressor 3. As part of the starting operation, the solenoid valve 11 is automatically opened so as to enable delivery of refrigerant through the expansion valve 12 into the evaporator coil 2. The blower motor 39, if not previously manually set into operation, will be started when the starting motor 31 is activated. In the operation of the construction illustrated schematically in Figure 1 under some conditions, the disperser motor 19 preferably is not started simultaneously with the activation of the engine starting motor 31, but is brought into operation only after the engine 4 is running under its own power to drive the fan 16 at a predetermined operating speed. When this speed has been attained, the disperser motor 19 is started automatically by control means to be described so as to cause the disperser disks 18 to deliver moisture in dispersed or fog-like condition into the air stream flowing through the duct 15 and against the condensing coils 8.

By means of control devices hereinafter described, the starting motor is deactivated and disconnected from the engine 4 automatically in any attempted starting operation which fails effectively to start the engine 4 within a predetermined time, for example four seconds, the starting motor 31 then automatically being reactivated following the lapse of a predetermined waiting period to initiate a second starting operation, and so on until the engine 4 has been started properly. Once the engine has been started properly and has attained normal operating speed, all of the units of the system will remain in operation until the thermostat in the conditioned area no longer calls for cooling. When this condition has been attained, the engine is automatically stopped and the disperser 18 and blower unit 39, 40, 40 come to rest, and the refrigerant valve 11 is closed.

An important aspect of the invention is the control mechanism for automatically initiating and continuing operation of the condensing and air cooling equipment described above. The control mechanism is capable of flexible variation in electrical circuitry and co-relation of the parts to suit different operating requirements. It may include such safeguards against misoperation as automatically discontinuing operation of the engine starting motor 31 in the event the engine 4 is not brought into operation under its own power within a normal or predetermined starting period, and automatically stopping the engine and closing the refrigerant valve 11 in response to abnormally high pressure in the compressor discharge line 6 or abnormally low pressure in the compressor intake line 5.

*Control circuit shown in Figure 2*

The control arrangement shown schematically in Figure 2 is illustrated in connection with the internal combustion engine 4, starting motor 31, solenoid operated refrigerant control valve 11, disperser motor 19, disperser disks 18, and blower motor 39 with associated blowers 40, 40, all as described above with reference to Figure 1. The Figure 2 control mechanism is operable by power supplied through main lines 44 and 45 equipped with a conventional fuse 46 in the line 44 and a master control or "on-and-off" switch 47. The conductors 44 and 45 lead through switch 47, when closed, to conductors 44ª and 45ª to the primary winding of a transformer 48, the secondary winding of which establishes low voltage for the operation of control devices hereinafter described.

The starter motor 31 is adapted to be energized by high voltage supplied from the conductors 44ª and 45ª, the starting motor circuit including the conductor 44ª, a conductor 44ᵇ, a conductor 44ᶜ, a normally open starter motor switch 49, a conductor 44ᵈ, the motor 31 itself and a conductor 45ᵇ leading to the conductor 45ª. Closing of the switch 49 will complete the circuit just traced so as to energize the starting motor 31.

The blower motor 39 is also arranged to be supplied with high voltage power from the lines 44ª and 45ª, the blower motor circuit including the conductor 44ª, a branch conductor 44ᵉ, a normally open switch 50, a conductor 51, the motor 39 itself, and the conductor 45ᶜ leading to the conductor 45ª. The normally open switch 50 may be closed under manual control or may be closed automatically as described later for completing the blower motor circuit and placing the blower in operation as part of the starting procedure.

The disperser motor 19 also is operable by high voltage supplied from the conductors 44ª and 45ª. The disperser motor circuit includes the conductor 44ª, the conductor 44ᵇ, a normally open switch 52, a conductor 44ᶠ, the disperser motor 19 itself, a conductor 45ᵈ, and the conductor 45ᵇ leading to the supply line conductor 45ª.

The closing of the starting switch 49, the blower switch 50 and the disperser motor switch 52 is effected by mechanism supplied with low voltage current from the secondary of the transformer 48. The relay coil 53ª of a main or operation initiating switch 53 is in circuit with the transformer secondary winding and a thermostat 54 in the area to be cooled. This circuit includes a conductor 55 leading from the transformer secondary through a normally closed manually operable control switch 56, the thermostat 54, a conductor 57, the relay coil 53ª and conductors 58 and 59 leading to the other side of the transformer secondary winding. When the space to be cooled does not call for the delivery of cooled air, the thermostat 54 is open or in circuit breaking position as shown in Figure 2 so that the coil 53ª will not be energized and the switch 53 will remain open. When the space to be cooled calls for the delivery of cooled air the thermostat 54 closes in a well known manner so as to complete the circuit outlined above through the relay coil 53ª, causing the movable element of the switch 53 to rise to closed position.

Closing of the operation initiating switch 53 conditions the engine 4 for being started, energizes the starting motor 31 and effects opening of the solenoid operated valve 11 for admitting refrigerant from the conduit 10 through the expansion valve 12 and into the evaporator coil 2. Normally, that is when the engine 4 is not running and the other parts are at rest, the engine magneto 60 is shorted to ground by ignition control means comprising conductors 61 and 62 and a normally closed switch 63. The first requirement for conditioning the engine 4 to be started is that of removing the short to ground of the magneto 60 by opening the switch 63, and energizing a solenoid operated valve 64 controlling the supply of fuel to the engine intake 36. Opening of the magneto shorting switch 63 is accomplished electrically in response to closing of the operation initiating switch 53 which establishes a circuit from the transformer secondary through a conductor 55ª, the closed switch 53, a conductor 55ᵇ, a normally closed high pressure cut-out switch 65, a conductor 55ᶜ, a normally closed low pressure cut-out switch 66, a conductor 55ᵈ, the relay coil 63ᵃ of the magneto shorting switch 63, a conductor 59ᵃ and a conductor 59 which leads to the opposite side of the transformer secondary. Thus, closing of the switch 53 in response to thermostatic call for cooling causes the switch 63 to be opened so as to condition the magneto 60 to deliver high tension impulses to the engine spark plugs 37.

The high pressure cut-out switch 65 is openable by expansion of a bellows 65ᵃ connected by a tube 65ᵇ to the compressor delivery line 6 in response to building up of pressure in the conduit 6 to a value above a predetermined upper safe pressure limit. Under normal starting and operating conditions, the switch 65 is closed, but if the pressure in the line 6 rises to an abnormally high level the bellows 65ᵃ will expand to open the switch 65, thus de-energizing the coil 63ᵃ of the magneto grounding switch 63 and permitting the latter to close for short circuiting the magneto and stopping or preventing starting of the engine 4. The low pressure cut-out switch 66 is maintained closed by a bellows 66ᵃ connected by a tube 66ᵇ to the compressor intake conduit 5 when the pressure in the intake conduit 5 is at or above a predetermined minimum pressure. If the pressure in the compressor intake conduit 5 falls below the predetermined minimum pressure, the bellows 66ᵃ will contract to open the switch 66 and thus prevent closing of the switch 63, or if the latter is closed, opening it for grounding the magneto 60. High and low pressure cut-out switches exercising similar controls are disclosed in the co-pending application of Thomas W. Carraway, Serial No. 571,771, filed March 15, 1956.

As a further step in conditioning the engine 4 for being started, the solenoid operated valve 64 controlling the fuel supply is energized. This is accomplished by closing a circuit through the valve 64 solenoid winding, the circuit comprising the conductors 55 and 55ᵃ, the closed operation initiating switch 53, the conductor 55ᵇ, the closed high pressure switch 65, the conductor 55ᶜ, the closed low pressure cut-out switch 66, conductors 55ᵈ, 55ᵉ, and 55ᶠ, the solenoid valve 64 itself, and conductors 59ᵇ and 59.

Closing of the operation initiating switch 53 also energizes the solenoid of the solenoid valve 11 for opening the latter to permit refrigerant to flow through the expansion valve 12 and into the evaporator coil 2. The circuit for operating the valve 11 includes the conductors 55, 55ᵃ, the closed switch 53, the conductor 55ᵇ, the closed high pressure cut-out switch 65, the conductor 55ᶜ, the closed low pressure cut-out switch 66, the conductors 55ᵉ and 55ᶠ, the solenoid valve 11 itself, and conductors 58 and 59.

The short to ground of the magneto 60 having been opened, the fuel valve 64 having been opened and the refrigerant supply valve having been opened, the equipment is in condition for starting of the engine 4 by the motor 31. This is effected by energizing the relay coil 49ᵃ of the starting switch 49 through a secondary control circuit comprising the conductors 55, and 55ᵃ, the closed operation initiating switch 53, the conductor 55ᵇ, the closed switch 65, the conductor 55ᶜ, the closed switch 66, and conductors 55ᵉ and 55ᵍ leading to an oil pressure cut-out switch generally designated 67. When the engine 4 is not operating and until it has come up to normal operating speed, the switch 67 is in the position shown in Figure 2 in which its conducting bar 67ᵃ bridges the two contacts 67ᵇ so that the circuit continues from the conductor 55ᵍ through the switch 67 to a conductor 55ʰ, thence through the relay coil 49ᵃ, a conductor 55ⁱ, a normally closed thermostatic switch 68, a conductor 55ʲ, a second normally closed thermostatic switch 69 and a conductor 59ᶜ to the transformer secondary winding conductor 59. By energizing of the relay coil 49ᵃ through the circuit just traced, the switch 49 is closed to cause operation of the starting motor 31. The latter will then turn over the engine 4 through the clutch 32. Normally the engine 4 will start to run under its own power very soon, say in less than about four seconds. As soon as the engine 4 has attained normal operating speed, the oil pressure in the engine lubricating system will build up to a value sufficient when transmitted through a tube 67ᶜ to a pressure responsive bellows element 67ᵈ for expanding the latter to lift the switch contact bar 67ᵃ away from the lower contacts 67ᵇ and into bridging relation with a pair of upper contacts 67ᵉ. Disconnection of the contact bar 67ᵃ from the lower contacts 67ᵇ will open the circuit through the motor starting switch coil 49ᵃ, thus opening the switch 49 and stopping operation of the starting motor 31 in response to operation of the engine 4 under its own power at a predetermined speed.

It is desirable to disable the starting motor 31 automatically in the event the engine 4 does not start to run under its own power within a reasonable time after activation of the starting motor. For this purpose, the control mechanism provides for interrupting operation of the starting motor 31 in response to running for a predetermined period, say about four seconds, without starting of the engine 4, for maintaining the motor 31 idle for another period of about four seconds, and for then activating the motor 31 again to make a further engine starting attempt. This avoids "cranking" the engine 4 for long periods of time which could be harmful to the starting mechanism. The disabling and re-enabling of the starting motor 31 is so controlled as to permit a number of starting attempts interspersed with waiting periods and, moreover, to disable the starting motor circuit completely and permanently if the engine 4 cannot be started within a predetermined maximum allowable starting time. In the event of such permanent disabling of the starting motor circuit, the person responsible for the operation of the equipment will be aware that something is wrong and thus will be given an opportunity to determine the difficulty. After determination and correction of the difficulty, the equipment can be prepared for being started only by actuation of a manually operable control device.

The control means for preventing unduly long and useless running of the starting motor 31 shown in Figure 2 includes a heating element 68ᵃ positioned in close proximity to the thermostatic switch 68 so that when the element 68ᵃ has been heated for a predetermined time, say about four seconds, the switch 68 will open to interrupt the circuit to the relay coil 49ᵃ, thus effecting opening of the starting motor switch 49. The circuit for energizing the heating element 68ᵃ comprises the conductors 55 and 55ᵃ, the closed switch 53, the conductor 55ᵇ, the closed switch 65, the conductor 55ᶜ, the closed switch 66, the conductor 55ᵉ, the oil pressure cut-out switch contacts 67ᵇ and bar 67ᵃ, the conductor 55ʰ, conductors 55ᵏ and 55ˡ, the heating element 68ᵃ, the conductor 55ⁱ, the normally closed switch 68, the conductor 55ʲ, the normally closed switch 69 and conductors 59ᶜ and 59.

In a normal starting operation in which the engine 4 begins to run within four seconds after energizing the starting motor 31, the switch 68 will remain closed so that the starting switch 49 will remain closed until after the bar 67ᵃ of the oil pressure cut-out switch has been disengaged from the lower contacts 67ᵇ, at which time the heating element 68ᵃ and the starting switch relay coil 49ᵃ will be de-energized. But if the engine 4 does not start within about four seconds, the thermally responsive circuit breaking switch means 68 will be heated sufficiently by the coil 68ᵃ to be opened, thus interrupting the circuits to the heating element 68ᵃ and the starting switch relay coil 49ᵃ. This will open the starting switch and permit the coil 68a and switch 68 to cool. After a period of about four seconds, the switch 68 will have cooled sufficiently to close, thus re-establishing the circuits through the heating element 68ᵃ and the starting switch coil 49ᵃ. In consequence, another starting operation will be initiated, and if the engine 4 starts to run within about four seconds, the starting circuits will be interrupted by rising of the oil pressure cut-out switch bar 67ª. If, however, this second starting attempt is unsuccessful within about four seconds, the switch 68 will again be opened, thereby again de-energizing the heating element 68ª and starting switch winding 49ª, following which there will be another period of starting motor inaction and cooling of the coil 68ª and switch 68.

Such repeated starting attempts, each of predetermined duration, will be carried out sequentially until the engine 4 has been started successfully or until passage of a predetermined maximum allowable overall time period of, say twenty seconds, at which time the thermally responsive switch 69 will automatically be opened so as to interrupt the circuit to the starting switch winding 49ª permanently, that is until the control equipment has been manually reset for operation. For this purpose, a second heating element 69ª is positioned in heat transferring proximity to the thermally responsive circuit breaking switch means 69, and is arranged to be energized uninterruptedly as long as the operation initiating switch 53 is closed and the oil pressure cut-out switch bar 67ª is in its lower position as shown in Figure 2. The circuit energizing the heating element 69ª comprises the conductors 55 and 55ª, the closed switch 53, conductor 55ᵇ, closed switch 65, conductor 55ᶜ, closed switch 66, conductors 55ᵈ, 55ᵉ, 55ᵍ, cut-out switch contacts 67ᵇ and bar 67ª, conductors 55ʰ and 55ᵏ, the heating element 69ª and conductors 59ᵈ and 59. This circuit will remain energized when the switch 53 is closed and until the oil pressure cut-out switch bar 67ª is raised to become disengaged from the lower contacts 67ᵇ. Thus, the heating element 69ª will remain energized throughout a series of operations and non-operation of the starting motor 31, irrespective of heating and cooling of the first heating element 68ª and opening and closing of its associated switch 68. If repeated operations of the starting motor 31 do not succeed in starting the engine 4 to run under its own power within the period of about twenty seconds, the heating element 69ª, constantly energized during the twenty second period, will heat the switch 69 sufficiently to open it, thus interrupting the circuit to the winding 49ª of the starting motor switch 49 and permitting the latter to open. Inasmuch as the heating element 69ª is kept energized as long as the bar 67ª of the oil pressure cut-out switch is in its lower position where it remains until the engine 4 has been started, the switch 69 will be constantly subjected to sufficient heat from the coil 69ª to maintain the switch 69 open until the starting difficulty has been removed and the control system reset manually.

The failure of several repeated starting attempts followed by opening of the switch 69 will indicate that the apparatus requires service attention. The person in charge may then open the manually operable control switch 56 which will de-energize the coil 53ª of the operation initiating switch and break the circuit to the heating element 69ª, permitting the latter to cool and the associated switch 69 to close. After the non-starting difficulty has been corrected, the control switch 56 may be closed to restore the control circuits and devices to operating condition.

It would generally be useless, in fact even undesirable for the disperser 18 to be started before the prime mover or engine 4 has been started and is driving the fan 16 at its normal operating speed. Starting the disperser 18 before the fan 16 is being driven at its normal operating speed by the engine 4 could result in fine globules of evaporative liquid drifting back into the part of the duct 15 housing the engine 4, clutches 32 and 33 and the compressor 3. Consequently, it is desirable to start the disperser motor 19 only after the prime mover 4 has been started. In one arrangement for effecting a delayed starting of the disperser motor 19, the disperser motor switch 52 is closed only after the oil pressure cut-out switch bar 67ª has been raised in response to building up of oil pressure caused by attainment of normal operating speed by the engine 4. When the switch bar 67ª has been raised into engagement with the upper contacts 67ᵉ, a circuit will be established through the relay coil 52ª of the disperser motor switch by way of the conductors 55, 55ª, the closed switch 53, conductor 55ᵇ, closed switch 65, conductor 55ᶜ, closed switch 66, conductors 55ᵈ, 55ᵉ, 55ᵍ, upper switch contacts 67ᵉ and bar 67ª, a conductor 55ᵐ, the switch coil 52ª itself and conductor 59.

The blower equipment 39, 40, 40 may be selectively or optionally placed in operation automatically in response to closing of the thermostat 54 in the area to be cooled, or by manual setting of a switch 70 in a position connecting the blower switch operating coil 50ª across the secondary of the transformer through conductors 59, 59ᵉ, 59ⁿ and the switch 70. Some persons prefer that, for ventilating or air circulating purposes, the blower equipment operate continuously instead of being started and stopped conjointly with the starting and stopping of the cooling and condensing equipment. When continuous blower operation is desired, the switch 70 may be set into the position shown in dotted lines in Figure 2 so that the coil 50ª will remain energized and the switch 50 will remain closed, irrespective of the opening and closing of the thermostat 54. If it is desired that the blower equipment 39, 40, 40 operate only when the cooling and condensing equipment is operating, the switch 70 is set into the position shown in full lines in Figure 2 so that the operating coil 50ª of the blower motor switch 50 will be energized only when the thermostat 54 is closed. In this setting of the switch 70, when the thermostat 54 is closed the coil 50ª is energized by a circuit including the conductor 55, closed switch 56, closed thermostat 54, conductors 57, 57ª, switch 70 in its lower or full line position, conductor 55ⁿ, coil 50ª, and conductors 59ᵉ and 59.

As a safeguard against continued operation of the condensing and cooling equipment if the engine 4 should become overheated, due for example to overloading the engine or depletion of the cooling water in the tank 25, a thermally responsive switch 71 mounted on the engine cylinder block is connected to the magneto 60 through a conductor 71ª. Closing of the switch 71 will ground the magneto and hence stop the engine 4.

*Operation—Figures 1 and 2*

Although operational phases have been explained in connection with the foregoing description of the apparatus and devices shown in Figures 1 and 2, a brief recapitulation of a typical operating procedure may be helpful. In preparing the system for operation, the main switch 47 will be closed, the control switch 56 closed, and the switch 70 set into the lower position shown in full lines in Figure 2. When the space to be cooled calls for delivery of cooled air, the thermostat 54 closes, thereby closing the blower switch 50 and closing the operation initiating switch 53. This will establish the several control circuits described above so as to open the magneto shorting switch 63, open the gas or fuel valve 64 and the refrigerant valve 11, and close the starting motor switch 49. If the engine 4 starts promptly, building up of pressure of the engine lubricant in the pressure responsive element 67ᵈ will raise the oil pressure cut-out switch bar 67ª to interrupt the circuit energizing the motor starting switch coil 49ª, thereby opening the starting switch 49. Raising of the oil pressure cutout switch bar 67ª will not, however, de-energize the fuel valve 64 and refrigerant supply valve 11 so that these valves will remain open after starting of the engine 4. When the oil pressure cut-out switch bar 67ª has been raised into engagement with the upper contacts 67ᵉ, the disperser motor switch 52 will be closed to place the disperser into operation. The refrigerant compressing, condensing and evaporation cooling cycle will then be performed until the thermostat 54 opens and breaks the circuit to the coil 53$^a$ of the operation initiating switch 53. Resultant opening of the switch 53 will de-energize the fuel valve 64 and refrigerant valve 11 for closing both valves, and will de-energize the coil 63$^a$ of the magneto shorting switch 63 for permitting the latter to be closed to stop the engine 4.

If the engine does not start promptly upon closing of the switch 49, this switch will be opened and closed periodically by opening and closing of the switch 68 until the engine has been started unless it has not been started after a period of about twenty seconds, in which event the starting motor circuit will be permanently disabled by opening of the switch 69 until an attendant has opened the control switch 56, has corrected the difficulty, and re-set the control switch 56.

Modifications shown in Figures 2$^a$ and 2$^b$

Figure 2$^a$ illustrates schematically a modified construction in which the disperser 18 is driven by the internal combustion engine 4 instead of by the separate motor 19 shown in Figure 2. In the construction shown in Figure 2$^a$, the disperser shaft 18$^a$ is driven by the internal combustion engine shaft 4$^b$ through a magnetic coupling or clutch generally designated 72. The coupling 72 comprises an impeller or driver portion 72$^a$ fixed to the engine shaft 4$^b$ and a follower or driven section 73 fixed to the disperser shaft 18$^a$ and positioned in magnetic force transmitting relation to the impeller section 72$^a$. The section 72$^a$ may conventionally include windings as illustrated schematically connected to slip rings 72$^b$ and 72$^c$ on the engine shaft 4$^b$. The slip rings are engaged respectively by brushes 72$^d$ and 72$^e$ in turn respectively connected to the conductors 45$^d$ and 44$^f$. The conductors 45$^d$ and 44$^f$ are connected with the other conductors and control devices of the control apparatus in the same manner as the conductors 45$^d$ and 44$^f$ shown in Figure 2. Thus, Figure 2$^a$ is to be considered in connection with Figure 2 as disclosing a control circuit and apparatus the same as that described with reference to Figure 2 with the exception that the disperser operation circuit, comprising the conductor 44$^b$, the switch 52, the conductor 44$^f$, the conductor 45$^d$ and the conductor 45$^b$, includes the magnetic clutch or coupling 72 instead of the motor 19 shown in Figure 2.

In operation of the construction shown in Figure 2$^a$, closing of the oil pressure cut-out switch 67 (Figure 2) when the engine 4 has attained operating speed will energize the winding of the magnetic coupling section 72$^a$ so as to cause the follower section 73 to be driven magnetically from the engine or prime mover shaft 4$^b$. The operation of the other control elements such as the starting motor 31, the blower equipment 39, 40, the solenoid valves 11 and 64 and so on will be the same as has been described with reference to Figure 2.

When space or other installation conditions render it difficult or unsatisfactory to drive the magnetic coupling 72 directly from the engine shaft 4$^b$, a flexible shaft, or shafting and bevel gearing, may be interposed between the engine shaft and the magnetic coupling 72. Figure 2$^b$ shows an arrangement similar to that illustrated in Figure 2$^a$, but more suitable for installations in which the engine shaft 4$^b$ and rotor or impeller 72$^a$ of the magnetic coupling cannot easily be aligned. As shown in Figure 2$^b$, the shaft 72$^f$ of the impeller 72$^a$ is offset from the engine shaft 4$^b$ and is drivable through a flexible shaft 72$^g$, which itself may be of conventional construction.

Modification shown in Figures 3 and 3$^a$

As indicated above, it generally is desirable to delay starting of the disperser 18 until after the engine 4 has attained operating speed. In some localities, the cooling water cost may be so small as to warrant simplifying the control circuit so as to omit the time delay control for the disperser, and operate the disperser directly or substantially so from the internal combustion engine 4. Such a modified arrangement is disclosed in Figures 3 and 3$^a$, Figure 3 showing a control circuit the same as that shown in Figure 2 with the exception that the disperser motor 19 and its operating and control circuits shown in Figure 2 are omitted from Figure 3. The disperser 18 is driven directly from the internal combustion engine shaft 4$^b$ as indicated in Figure 3$^a$, a pair of bevel gears 74 providing the required direct drive transmitting connection between the engine shaft 4$^b$ and the disperser shaft 18$^a$.

The operation of the embodiment illustrated in Figures 3 and 3$^a$ is the same as the operation of the arrangement shown in Figures 1 and 2 and described above, with the exception that the disperser 18 starts to operate as soon as the engine 4 operates.

Modification shown in Figure 4

The control apparatus shown in Figure 4 is arranged to provide for optional indirect thermostatic controlling of the starting of the engine 4 and compressor 3, that is by initiating the starting operation only after the refrigerant supply valve 11 has been opened following a period of non-operation, and refrigerant has flowed through the evaporator coil 2 and into the compressor intake line 5 sufficiently to build up a predetermined pressure in the line 5. Many of the control elements and circuit conductors shown in Figure 4 are the same as elements and conductors shown in Figure 2 and are corelatively arranged in the same manner as in Figure 2. These elements are designated in Figure 4 with reference characters the same as those designating corresponding elements in Figure 2. Certain of the elements shown in Figure 2 are not shown in Figure 4. Additionally, Figure 4 shows elements and conductors not shown in Figure 2 and these are all designated by reference characters in the "100" series, that is, 100, 101, etc. Thus, Figure 4 shows a triple pole double throw switch generally designated 100 and comprising three arms or poles 100$^a$, 100$^b$ and 100$^c$; three contacts 100$^d$, 100$^e$ and 100$^f$ on one side of the poles; and three other contacts 100$^g$, 100$^h$ and 100$^i$ on the other side of the poles. The contacts 100$^d$ and 100$^f$ are bridged by a conductor 100$^j$, and the poles 100$^b$ and 100$^c$ are bridged by a conductor 100$^k$. The contacts 100$^e$ and 100$^h$ are bridged by a conductor 100$^l$.

The bridge 100$^k$, and hence the poles 100$^b$ and 100$^c$, are connected to the conductor 55 leading to the transformer in the same manner as in Figure 2. The bridge 100$^l$, and hence the contacts 100$^e$ and 100$^h$, are connected to the thermostat 54 by a conductor 101. A conductor 102 leads from the contact 100$^g$ to a conductor 103 which is connected to the conductor 57 leading to the thermostat 54. The conductor 103 also leads to one side of the refrigerant control valve 11.

The switch pole 100$^a$ is connected to a conductor 104 which leads to a coil 105$^a$ of a relay switch 105, and thence through a conductor 106 to a normally open low pressure cut-out switch 166 similar to the switch 66 shown in Figure 2 but being biased differently, the switch 166 normally being open and being closable only when refrigerant in the compressor intake line 5 and acting through a tube 166$^b$ has attained sufficient pressure to expand the switch bellows 166$^a$ and close the switch 166. The switch 166 is connected through the conductor 55$^c$ to the high pressure cut-out switch 65 which is normally closed, as in Figure 2. A conductor 107 leads from the switch 65 to the conductor 59, and thence to the transformer secondary.

A conductor 108 leads from the transformer secondary conductor 55 to the normally open switch 105 and thence through a conductor 109 to the conductor 55$^d$. A conductor 110 extends from the conductor 55$^g$ to the conductors 109 and 55$^d$.

When the triple pole switch 100 is set as indicated in full lines in Figure 4, the control apparatus is conditioned for effecting indirect control of the engine starting as explained above, that is starting of the engine, not immediately upon closing of the thermostat 54, but only after the valve 11 has been opened and refrigerant pressure has built up to a predetermined extent in the compressor intake line 5. When the apparatus has been so conditioned for indirect control, closing of the thermostat 54 immediately closes the circuit to the blower motor and starts the latter as explained in connection with Figure 2. Closing of the thermostat 54 also immediately opens the refrigerant supply valve 11 which is energized in response to thermostat closing through a circuit including the conductor 59, a conductor 111, the valve 11 solenoid, conductors 103 and 57, the thermostat 54, conductor 101, contact 100ʰ, bridge 100ⁱ, contact 100ᵉ, switch pole 100ᵇ, bridge 100ᵏ, and conductor 55. Closing of the thermostat 54 immediately effects operation of the blower 39, 40, and immediately opens the refrigerant supply valve 11 so as to cause refrigerant under pressure in the liquid receiver 9 to flow into the evaporator coil 2 and thence into the compressor intake line 5 for increasing or building up pressure in the line 5.

Closing of the thermostat 54 does not immediately effect operation of the engine starting mechanism and the disperser motor 19. Operation of the engine starting mechanism is initiated by closing of the normally open low pressure cut-out switch 166 caused by the building up of pressure in the compressor intake line 5 and consequently in the tube 166ᵇ leading from the line 5, and in the bellows 166ᵃ. The closing of the switch 166 effects closing of the main starting control switch 105 through a circuit including the conductors 59 and 107, the normally closed high pressure cut-out switch 65, the conductor 55ᶜ, the now closed low pressure cut-out switch 166, the conductor 106, the coil 105ᵃ of the switch 105, the conductor 104, the switch pole 100ᵃ, switch contact 100ᵈ, bridge 100ʲ, switch contact 100f, switch pole 100ᶜ, bridge 100ᵏ and conductor 55.

Closing of the main starting control switch 105 opens the magneto to ground switch 63 by energizing the coil 63ᵃ. The coil energizing circuit comprises the conductors 59 and 59ᵃ, the coil 63ᵃ itself, conductors 55ᵈ and 109, the closed operation initiating switch 105, and the conductors 108 and 55. Closing of the switch 105 also effects opening of the gas valve 64 by energizing a circuit comprising the conductors 59 and 59ᵇ, the solenoid of the valve 64, the conductors 55ᵍ, 110 and 109, the closed switch 105, and conductors 108 and 55.

As explained with reference to Figure 2, opening of the magneto to ground switch 63 and opening of the gas valve 64 prepares the engine 4 for being started by operation of the starting motor 31. Substantially simultaneously with the opening of the magneto to ground switch 63, and again in response to the closing of the switch 105, the switch coil 49ᵃ of the starting motor switch 49 is energized so as to close the switch 49. This coil energizing circuit comprises the conductors 59 and 59ᶜ, the thermally responsive switch 69, conductor 55ʲ, thermally responsive switch 68, conductor 55ˡ, the switch coil 49ᵃ itself, conductor 55ʰ, lower contacts 67ᵇ and bar 67ᵃ of the oil pressure cut-out switch 67, conductors 110 and 109, the now closed switch 105 and conductors 108 and 55.

The disperser motor 19, when controlled by the apparatus shown in Figure 4, is not started until after the engine 4 has attained operating speed and normal oil pressure has been built up in the engine lubricating system, the tube 67ᶜ, and the oil pressure cut-out switch bellows 67ᵈ. When the predetermined oil pressure has built up in the bellows 67ᵈ, the switch bar 67ᵃ is raised to bridge the contacts 67ᵉ, 67ᵉ. This energizes the coil 52ᵃ of the disperser motor switch 52 through a circuit comprising the conductors 59 and 59ᵃ, the switch coil 52ᵃ itself, the conductor 55ᵐ, upper contacts 67ᵉ and bar 67ᵃ of the switch 67, conductors 110 and 109, the closed switch 105 and conductors 108 and 55. Energizing of the switch coil 52ᵃ closes the switch 52 and effects operation of the disperser equipment 18, 19 as explained with reference to Figure 2. It may be noted that in the operation of the equipment shown in Figure 4 when conditioned for indirect control, two successive time lags occur between the thermostatic call for operation and the starting of the disperser motor 19. The first lag is that incident to the delay in building up of pressure in the compressor intake line 5 following opening of the refrigerant supply valve 11. The second lag is that due to the time required for starting of the engine 4 and building up of its lubricating oil pressure sufficiently to raise the bar 67ᵃ of the oil pressure cut-out switch 67.

The mechanism for disabling the starting motor circuit in the event the engine 4 does not start in response to a normal period of cranking is similar to that described with reference to Figure 2. In the control arrangement shown in Figure 4, the short period starting disabling circuit includes the conductors 59 and 59ᶜ, the thermally responsive switch 69, the conductor 55ʲ, the thermally responsive switch 68, the conductor 55ˡ, the starting motor switch coil 49ᵃ, the conductor 55ʰ, the oil pressure responsive switch contacts 67ᵇ and bar 67ᵃ, the conductors 110 and 109, the closed switch 105 and the conductors 108 and 55. The heating coil 68ᵃ, as in the case in Figure 2, is connected between conductors 55ⁱ and 55ˡ, the latter in turn being connected to the conductors 55ᵏ and 55ʰ. Heating of the coil 68ᵃ for a predetermined short starting period will open the switch 68, thereby both opening the starting motor switch 49 and de-energizing the coil 68ᵃ. Upon cooling of the coil 68ᵃ, the switch 68 will close to bring about another starting attempt. As is the case in Figure 2, raising of the oil pressure cut-out switch bar 67ᵃ will disable the starting motor switch circuit and the circuit to the heating element 68ᵃ.

The Figure 4 control circuit also is similar to the Figure 2 control circuit with respect to disabling the starting mechanism following a predetermined overall lapse of time during which several unsuccessful starting attempts have been made under the control of the thermally responsive switch 68 and its heating coil 68ᵃ. The long period control circuit includes the conductors 59 and 59ᶜ, the thermally responsive switch 69, the conductor 55ʲ, the thermally responsive switch 68, the conductor 55ˡ, the coil 49ᵃ of the starting motor switch 49, the conductor 55ʰ, the lower contacts 67ᵇ and bar 67ᵃ of the oil pressure cut-out switch 67, the conductors 110 and 109, the switch 105, and the conductors 108 and 55. The circuit for energizing the heating element 69ᵃ to open the switch 69 includes the conductor 59ᵈ connected to the conductor 59 and the conductor 55ᵏ connected to the conductor 55ʰ. The arrangement is such that the heating element 69ᵃ will be energized until the switch bar 67ᵃ is raised upon starting of the engine 4, or the switch 105 is opened in consequence of opening of the switch 166 caused by falling of the pressure in the compressor intake line 5 due to the cooling of refrigerant in this line. The switch bar 67ᵃ, of course, will not be raised to de-energize the heating coil 69ᵃ unless and until the engine has been started and its lubricating oil pressure built up sufficiently to expand the bellows 67ᵈ. If the engine 4 does not start in response to a predetermined number of successive starting efforts, the starting efforts will be discontinued until the person in charge determines the difficulty, corrects it, and re-sets the control circuit.

When the equipment controlled by the arrangement disclosed in Figure 4 is operating normally and the area being cooled attains a predetermined temperature satisfying the call for cooling, the apparatus will be stopped in response to opening of the thermostat 54. Opening of the thermostat immediately opens the circuit which energizes the coil 50ᵃ of the blower switch 50 so as to stop the blower motor 39, unless, of course, the switch 70 has been set in its upper or dotted line position to provide for continuous blower operation. Opening of the thermostat 54 will also break the circuit which energizes the solenoid of the refrigerant supply valve 11, causing the latter to close to prevent further flow of refrigerant from the evaporator coil to the compressor intake line 5. Immediately after opening of the thermostat 54 the switch 105 will still be closed so that the engine 4 and compressor 3 and the disperser 18 will continue in operation temporarily. Continued operation of the compressor after the valve 11 has closed will pump down or reduce the pressure in the compressor intake line 5 until the bellows 166ª of the low pressure cut-out switch 166 contracts, thereby opening the switch 166. The opening of the switch 166 will break the circuit which energized the coil 105ª of the switch 105 so as to cause the latter to open, resulting in de-energizing of the circuits including the magneto to ground switch coil 63ª, the solenoid operated gas valve 64, and the coil 52ª of the disperser motor switch 52. Consequently, the engine 4 will be stopped, the valve 64 will be closed, and the disperser 18 will be stopped simultaneously after the compressor has reduced the pressure of refrigerant in the compressor intake line 5 to a value at which the switch 166 opens.

The control arrangement shown in Figure 4 may be set or conditioned for causing the starting equipment to operate immediately upon closing of the thermostat 54, a type of direct control the same as that effected with the arrangement shown in Figure 2. Conditioning of the Figure 4 circuit for effecting such direct controlling of the apparatus is accomplished by shifting the triple pole switch 100 to bring its poles 100ª, 100ᵇ and 100ᶜ respectively into engagement with the contacts 100ᵍ, 100ʰ and 100ⁱ.

In the direct control type of operation, the engine and compressor stop immediately upon opening of the thermostat 54 when the call for cooling has been satisfied. Consequently, the compressor will not pump down the pressure in the intake line 5 when the apparatus stops so that the compressor intake or suction pressure normally will remain sufficiently high during periods of non-operation to maintain the bellows 166ª expanded and the switch 166 closed.

With the triple pole switch 100 set for direct control and with the switch 166 in closed position, closing of the thermostat 54 will immediately energize the blower motor switch coil 50ª through a circuit including the conductors 59 and 59ᵉ, the coil 50ª, the conductor 55ⁿ, the switch 70, conductors 57ª and 57, the thermostat 54 and switch 56, the conductor 101, switch contact 100ʰ, switch pole 100ᵇ, bridge 100ᵏ and conductor 55. This will close the blower switch 50 and the blower will be operated.

Closing of the thermostat 54 will also energize the refrigerant supply valve through a circuit including conductors 59 and 111, the solenoid of the valve 11, conductors 103 and 57, the thermostat 54 and switch 56, conductor 101, switch contact 100ʰ and switch pole 100ᵇ, bridge 100ᵏ and conductor 55.

Closing of the thermostat will also energize the coil 105ª of the switch 105 through a circuit including the conductors 59 and 107, the normally closed high pressure cut-out switch 65, conductor 55ᶜ, the closed switch 166, conductor 106, the coil 105ª itself, conductor 104, switch pole 100ª, switch contact 100ᵍ, conductors 102, 103, 57, the thermostat 54 and switch 56, conductor 101, switch contact 100ʰ and pole 100ᵇ, bridge 100ᵏ and conductor 55.

Energizing of the coil 105ª will close the switch 105 so as first to open the magneto to ground switch 63, open the gas valve 64 and close the starting motor switch 49, and then to close the disperser motor switch 52 after the engine oil pressure has raised the bar 67ª of the oil pressure cut-out switch 67.

When the thermostat opens, the blower is stopped, the refrigerant valve 11 is opened and the switch 105 is opened to close the magneto to ground switch 63, close the gas valve 64, and open the disperser motor switch 52.

*Modification shown in Figure 5*

Figure 5 shows a control circuit similar to that shown in Figure 4 in that the Figure 5 circuit includes a three pole double throw switch 100 optionally settable for effecting either direct or indirect thermostatic control of the starting of the apparatus. The Figure 5 circuit differs from the Figure 4 circuit in that the Figure 5 circuit does not include the disperser motor 19 and disperser motor switch 52 and the associated conductors 44ᵇ, 44ᶠ, 45ᵈ, and 55ᵐ so that the electrical equipment shown in Figure 5 does not, in itself and directly control the starting and stopping of the disperser 18. When using the modified circuit shown in Figure 5, the disperser 18 may be driven from the engine shaft 4ᵇ, for example, either through the magnetic clutch apparatus shown in Figure 2ª or the bevel gear drive shown in Figure 3ª. With the exception of the disperser 18 being operated by the engine shaft 4ᵇ the other components of the apparatus including the engine 4, the compressor 3, the blower 40, the refrigerant supply valve 11 and the gas valve 64, will be controlled by the Figure 5 circuit in the same manner as these components are controlled by the Figure 4 circuit.

The constructions and control arrangements shown embody the invention in preferred forms, but it is intended that the disclosure be illustrative rather than definitive, the invention being defined in the claims.

I claim:

1. In evaporative condensing apparatus, a heat exchanger; a compressor; means for delivering fluid from said compressor into said heat exchanger; an internal combustion engine; means for transmitting drive from said internal combustion engine to said compressor; a fan for moving an air stream in contact with said heat exchanger; means for dispersing evaporative liquid in said air stream; means for starting said internal combustion engine and said fan; and means responsive to building up of pressure of the internal combustion engine lubricating oil when said internal combustion engine has attained a predetermined operating speed for initiating operation of said dispersing means.

2. In evaporative condensing apparatus, a heat exchanger; a compressor; means for delivering fluid from said compressor into said heat exchanger; an internal combustion engine; means for transmitting drive from said internal combustion engine to said compressor; means for dispersing evaporative liquid in the region of said heat exchanger for surface contact therewith; means for starting said internal combustion engine; and means responsive to building up of pressure of the internal combustion engine lubricating oil when said internal combustion engine is operating under its own power at a predetermined speed for initiating operation of said dispersing means.

3. In evaporative condensing apparatus, a heat exchanger; a compressor; means for delivering fluid from said compressor into said heat exchanger; an internal combustion engine; means for transmitting drive from said internal combustion engine to said compressor; means for dispersing evaporative liquid in the region of said heat exchanger; an electrical motor for starting said internal combustion engine; electrical means for effecting operation of said liquid dispersing means; and control means including a first switch for closing a circuit through said electrical starting motor, a second switch for closing a circuit through said electrical means, and means responsive to operation of said internal combustion engine under its own power at a predetermined speed for operating said second switch.

4. In evaporative condensing apparatus, a heat exchanger; a compressor; means for delivering fluid from said compressor into said heat exchanger; an internal combustion engine; means for transmitting drive from said internal combustion engine to said compressor; means for dispersing evaporative liquid in the region of said heat exchanger; an electrical motor for starting said internal combustion engine; electrical means for effecting operation of said liquid dispersing means; and control means including a first switch for closing a circuit through said electrical starting motor, a second switch for closing a circuit through said electrical means, and means responsive to building up of pressure of the internal combustion engine lubricating oil caused by operation of said internal combustion engine under its own power for operating said second switch.

5. In evaporative condensing apparatus, a heat exchanger; a compressor; means for delivering fluid from said compressor into said heat exchanger; an internal combustion engine; means for transmitting drive from said internal combustion engine to said compressor; means for dispersing evaporative liquid in the region of said heat exchanger; an electrical motor for starting said internal combustion engine; electrical means for effecting operation of said liquid dispersing means; and control means including a first switch for closing a circuit through said electrical starting motor, a second switch means settable in two positions in the first of which positions it is in circuit with said first switch for cooperating with the latter to close the electrical starting motor circuit, and in the second of which positions it breaks the electrical starting motor circuit and closes a circuit through said electrical means for effecting operation of said liquid dispersing means; and means responsive to operation of said internal combustion engine under its own power for operating said second switch means from said first of its positions to said second of its positions.

6. Apparatus as set forth in claim 5 in which said electrical means for effecting operation of said liquid dispersing means comprises an electrical motor.

7. Apparatus as set forth in claim 5 in which said electrical means for effecting operation of said liquid dispersing means comprises a magnetic clutch interposed between said internal combustion engine and said liquid dispersing means.

8. Power drive equipment for operating a gas compressor comprising an internal combustion engine; an electrical motor for starting said internal combustion engine; starting control means including an operation initiating switch for closing a circuit through said electrical motor for effecting operation thereof; means for breaking said circuit in response to operation of said electrical motor for a predetermined period without effective starting of said internal combustion engine and operation of the latter at said predetermined speed, said circuit breaking means including a thermally responsive switch in said circuit, said thermally responsive switch being automatically openable in response to being heated to a predetermined temperature and being automatically closable in response to cooling below said predetermined temperature, and a heating element positioned in heat transferring relation to said thermally responsive switch for opening the latter in response to heating of said heating element, said heating element being energizable by closing of said operation initiating switch irrespective of the open or closed condition of said thermally responsive switch; and means for breaking said electrical motor circuit and for de-energizing said heating element in response to operation of said internal combustion engine under its own power at a predetermined speed.

9. Power drive equipment for operating a gas compressor comprising an internal combustion engine; an electrical motor for starting said internal combustion engine; starting control means including an operation initiating switch for closing a circuit through said electrical motor for effecting operation thereof; means for breaking said circuit in response to operation of said electrical motor for a predetermined period without effective starting of said internal combustion engine and operation of the latter at said predetermined speed, said circuit breaking means including a thermally responsive switch in said circuit, said thermally responsive switch being automatically openable in response to being heated to a predetermined temperature and being automatically closable in response to cooling below said predetermined temperature, and a heating element positioned in heat transferring relation to said thermally responsive switch for opening the latter in response to heating of said heating element, said heating element being energizable by closing of said operation initiating switch irrespective of the open or closed condition of said thermally responsive switch; a pressure responsive element operable in response to building up of the pressure of the internal combustion engine lubricating oil when said internal combustion engine has been started and is operating under its own power at said predetermined speed; and an oil pressure cut-out switch operable in response to operation of said pressure responsive element for opening said electrical motor circuit and de-energizing said heating element.

10. Power drive equipment for operating a gas compressor comprising an internal combustion engine; an electrical motor for starting said internal combustion engine; starting control means including an operation initiating switch for closing a circuit through said electrical motor for effecting operation thereof; means for breaking said circuit in response to operation of said electrical motor for a predetermined period without effective starting of said internal combustion engine and operation of the latter at said predetermined speed, said circuit breaking means comprising a first thermally responsive switch in said circuit, said first thermally responsive switch being automatically openable in response to being heated to a predetermined temperature and being automatically closable in response to cooling below said predetermined temperature, a first heating element positioned in heat transferring relation to said first thermally responsive switch for opening the latter in response to heating of said first heating element, said first heating element being controlled by said first thermally responsive switch for being de-energized when said first thermally responsive switch has been opened in consequence of failure of said internal combustion engine to start in said predetermined period, whereby said first heating element will be permitted to cool to enable re-closing of said first thermally responsive switch and a further operation of said electrical motor, a second thermally responsive switch in said circuit, and a second heating element positioned in heat transferring relation to said second thermally responsive switch for opening the latter in response to heating of said second heating element, said second heating element being energizable by closing of said operation initiating switch irrespective of the open or closed positions of said first and second thermally responsive switches, said first thermally responsive switch being openable by heating of said first heating element in a shorter period than the period in which said second thermally responsive switch is openable by heating of said second heating element; and means for breaking said electrical motor circuit and for de-energizing said first and second heating elements in response to operation of said internal combustion engine under its own power at a predetermined speed.

11. Power drive equipment for operating a gas compressor comprising an internal combustion engine; an electrical motor for starting said internal combustion engine; starting control means including an operation initiating switch for closing a circuit through said electrical motor for effecting operation thereof; means for breaking said circuit in response to operation of said electrical motor for a predetermined period without effective starting of said internal combustion engine and operation of the latter at said predetermined speed, said circuit breaking means including a thermally responsive switch in said circuit, said thermally responsive switch being automatically openable in response to being heated to a predetermined temperature and being automatically closable in response to cooling below said predetermined temperature, and a heating element positioned in heat transferring relation to said thermally responsive switch for opening the latter in response to heating of said heating element, said heating element being energizable by closing of said operation initiating switch irrespective of the open or closed condtion of said thermally responsive switch; a normally closed switch operable manually for effecting opening of said electrical motor circuit and de-energizing of said heating element; and means for breaking said electrical motor circuit and for de-energizing said heating element in response to operation of said internal combustion engine under its own power at a predetermined speed.

12. Power drive equipment for operating a gas compressor comprising an internal combustion engine having a normally closed electrically openable fuel inlet valve; an electrical motor for starting said internal combustion engine; starting means comprising a normally open electrically closable starting switch in circuit with said electrical motor, and means including a first control circuit and an operation initiating switch, closable for effecting opening of said electrically openable fuel inlet valve and a second control circuit also including said operation initiating switch for closing said electrically closable starting switch in response to closing of said operation initiating switch; and means responsive to building up of pressure of the internal combustion engine lubricating oil when said internal combustion engine has attained a predetermined operating speed under its own power for effecting opening of said second control circuit and said electrically closable starting switch while said operation initiating switch remains closed, said first control circuit remains energized and said electrically operable fuel inlet valve remains open.

13. Power drive equipment for operating a gas compressor comprising an internal combustion engine having a normally closed electrically openable fuel inlet valve and ignition means; an electrical motor for starting said internal combustion engine; starting means comprising a normally open electrically closable starting switch in circuit with said electrical motor, ignition control means normally disabling said ignition means and being operable electrically for enabling said ignition means, and means including an operation initiating switch closable for effecting opening of said electrically openable fuel inlet valve, operation of said ignition control means to enable said ignition means, and closing of said electrically closable starting switch; and means responsive to building up of pressure of the internal combustion engine lubricating oil when said internal combustion engine has attained a predetermined operating speed under its own power for effecting opening of said electrically closable starting switch while said operation initiating switch remains closed, said electrically operable fuel inlet valve remains open, and said ignition control means remains in operated condition and said ignition means remains enabled.

14. Power drive equipment for operating a gas compressor comprising an internal combustion engine having a normally closed electrically openable fuel inlet valve and ignition means; an electrical motor for starting said internal combustion engine; starting means comprising a normally open electrically closable starting switch in circuit with said electrical motor; ignition control means normally disabling said ignition means and being operable electrically for enabling said ignition means, and means including an operation initiating switch closable for effecting opening of said electrically openable fuel inlet valve, operation of said ignition control means to enable said ignition means, and closing of said electrically closable starting switch; means including a thermally responsive switch in circuit with said electrical motor and a heating element positioned in heat transferring relation to said thermally responsive switch for opening the latter in response to heating of said heating element, said heating element being energizable by closing of said operation initiating switch for heating and thereby opening said thermally responsive switch for breaking the electircal motor circuit in response to operation of said electrical motor for a predetermined period without effective starting of said internal combustion engine and operation of the latter under its own power at a predetermined speed; and means responsive to operation of said internal combustion engine under its own power for opening said electrically closable starting switch while said operation initiating switch remains closed, said electrically operable fuel valve remains open, and said ignition means remains enabled.

15. Apparatus as set forth in claim 14 in which the means for transmitting drive from the internal combustion engine to the compressor comprises a speed responsive clutch.

16. In a condensing apparatus, a heat exchanger; a compressor; means connecting said compressor to said heat exchanger for delivering fluid into said heat exchanger; a jacketed internal combustion engine drivingly connected to said compressor; a radiator; means providing a coolant circulation system including the engine jacket and said radiator; an electrical motor for starting said internal combustion engine; a fan for moving an air stream in contact with said heat exchanger and said radiator; electrically operable means for dispersing evaporative liquid in said air stream; and control means comprising a starting switch for closing a circuit through said electrical motor, a second switch for closing a circuit through said electrically operable dispersing means, and means responsive to operation of said internal combustion engine under its own power for operating said second switch.

17. In a condensing apparatus, a heat exchanger; a compressor; means connecting said compressor to said heat exchanger for delivering fluid into said heat exchanger; a jacketed internal combustion engine drivingly connected to said compressor; a radiator; means providing a coolant circulation system including the engine jacket and said radiator; an electrical motor for starting said internal combustion engine; a fan for moving an air stream in contact with said heat exchanger and said radiator; electrically operable means for dispersing evaporative liquid in said air stream; and control means comprising a starting switch for closing a circuit through said electrical motor, a second switch means settable in two positions in the first of which positions it is cooperable with said starting switch for closing said circuit through said electrical motor and in the second of which positions it interrupts said circuit through said electrical motor and closes a circuit through said electrically operable dispersing means, and means operable in response to running of said internal combustion engine under its own power for operating said second switch means from said first of its positions to said second of its positions.

References Cited in the file of this patent

UNITED STATES PATENTS

| | | |
|---|---|---|
| 1,796,627 | Schmeiding et al. | Mar. 17, 1931 |
| 2,070,379 | Stramaglia | Feb. 9, 1937 |
| 2,187,397 | Goggins | Jan. 16, 1940 |
| 2,197,726 | Johnson | Apr. 16, 1940 |
| 2,251,376 | Ross | Aug. 5, 1941 |
| 2,286,961 | Hanson | June 16, 1942 |
| 2,301,725 | Wile | Nov. 10, 1942 |
| 2,311,622 | Alexander et al. | Feb. 23, 1943 |
| 2,323,511 | Baker | July 6, 1943 |
| 2,352,774 | Dermond | July 4, 1944 |
| 2,401,426 | Killoran | June 4, 1946 |
| 2,497,028 | Kirkpatrick | Feb. 7, 1950 |
| 2,771,068 | Jettinghoff | Nov. 20, 1956 |
| 2,817,022 | Comer et al. | Dec. 17, 1957 |